United States Patent
Kim et al.

(10) Patent No.: US 8,910,804 B2
(45) Date of Patent: Dec. 16, 2014

(54) SUPPORTING DEVICE OF DISPLAY APPARATUS

(75) Inventors: Tae Sung Kim, Suwon-si (KR); Jung Ho Shin, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 936 days.

(21) Appl. No.: 12/971,107

(22) Filed: Dec. 17, 2010

(65) Prior Publication Data
US 2011/0163052 A1   Jul. 7, 2011

(30) Foreign Application Priority Data
Jan. 7, 2010 (KR) .................. 10-2010-0001369

(51) Int. Cl.
A47F 5/08 (2006.01)
F16M 11/04 (2006.01)
F16M 13/02 (2006.01)
F16M 11/10 (2006.01)

(52) U.S. Cl.
CPC ............ *F16M 11/10* (2013.01); *F16M 11/046* (2013.01); *F16M 13/02* (2013.01); *F16M 11/045* (2013.01); *F16M 11/048* (2013.01); Y10S 248/919 (2013.01)
USPC ....................... 211/87.01; 248/919

(58) Field of Classification Search
USPC ........... 248/917–924; 345/1.1–1.3, 902, 903, 345/905; 361/679.04, 679.06, 679.07, 361/679.21; 211/87.01
See application file for complete search history.

(56) References Cited

U.S. PATENT DOCUMENTS

| | | | | |
|---|---|---|---|---|
| 2,865,124 A * | 12/1958 | Mortellito | ....................... | 40/605 |
| 4,602,855 A * | 7/1986 | Frey | ............................... | 359/875 |
| 5,251,570 A * | 10/1993 | Creech | ......................... | 116/225 |
| 5,694,881 A * | 12/1997 | Creech | ......................... | 116/222 |
| 6,343,006 B1 * | 1/2002 | Moscovitch et al. | .... | 361/679.04 |
| 6,554,238 B1 * | 4/2003 | Hibberd | ..................... | 248/278.1 |
| 6,554,242 B2 * | 4/2003 | Kim | ..................... | 248/371 |
| 6,604,722 B1 * | 8/2003 | Tan | ............................. | 248/276.1 |
| 6,739,096 B2 * | 5/2004 | Feldpausch et al. | ........... | 52/36.1 |
| 7,063,295 B2 * | 6/2006 | Kwon | ........................ | 248/276.1 |
| 7,331,551 B2 * | 2/2008 | Oddsen, Jr. | ................ | 248/279.1 |
| 7,780,131 B2 * | 8/2010 | Oh | ............................. | 248/276.1 |
| 7,823,847 B2 * | 11/2010 | Bremmon et al. | ........... | 248/201 |
| 7,963,489 B2 * | 6/2011 | O'Keene et al. | .............. | 248/201 |
| 8,322,673 B2 * | 12/2012 | Sculler | ........................ | 248/317 |
| 2002/0033436 A1 * | 3/2002 | Peng et al. | ................. | 248/284.1 |
| 2003/0231460 A1 * | 12/2003 | Moscovitch | ................. | 361/681 |
| 2009/0200439 A1 | 8/2009 | Bremmon et al. | | |
| 2009/0278011 A1 * | 11/2009 | Luijben et al. | ............. | 248/284.1 |

FOREIGN PATENT DOCUMENTS

| | | |
|---|---|---|
| CN | 101123705 | 2/2008 |
| JP | 2000-242191 | 9/2000 |
| KR | 1020080019489 | 3/2008 |

OTHER PUBLICATIONS

Office Action issued in Chinese Application No. 201010610085.7 on Mar. 12, 2014.

* cited by examiner

*Primary Examiner* — Korie H Chan
(74) *Attorney, Agent, or Firm* — Staas & Halsey LLP.

(57) ABSTRACT

A supporting device of a display apparatus to fix the display apparatus to a wall includes a first supporting unit coupled to the display apparatus, a second supporting unit fixed to the wall such that the second supporting unit is coupled to the first supporting unit, and a position adjustment unit to move the display apparatus in three axis directions.

24 Claims, 14 Drawing Sheets

SUPPORTING DEVICE OF DISPLAY APPARATUS

CROSS-REFERENCE TO RELATED APPLICATIONS

This application claims the benefit of Korean Patent Application No. 2010-0001369, filed on Jan. 7, 2010 in the Korean Intellectual Property Office, the disclosure of which is incorporated herein by reference.

BACKGROUND

1. Field of the Invention

Exemplary embodiments of the present general inventive concept relate to a supporting device to fix a display apparatus to a wall.

2. Description of the Related Art

A display apparatus displays images on a screen such as a television or a computer monitor. The display apparatus may include a cathode ray tube (CRT) display, a liquid crystal display (LCD), and a plasma display panel (PDP).

The LCD and the PDP, which are flat panel displays, are thin, and therefore, the LCD and the PDP may be mounted to a wall to achieve more effective space utilization. For this reason, various kinds of supporting devices to mount a display apparatus to a wall have been developed.

A supporting device may fix one or more display apparatuses to a wall. The supporting device is mounted to the wall at the maximum accuracy to accurately arrange the display apparatuses with respect to the wall. Specifically, accurate arrangement between neighboring display apparatuses is achieved by the supporting device.

When the supporting device is mounted to a wall, however, an installation error may occur. Also, when one or more display apparatuses are fixed to a wall using the supporting device, an assembly error may occur.

SUMMARY

It is a feature of the present general inventive concept to provide a supporting device of a display apparatus that may adjust the position of the display apparatus.

It is another feature of the present general inventive concept to provide a supporting device of a display apparatus that may enable the display apparatus to be easily replaced or repaired.

Additional features of the general inventive concept will be set forth in part in the description which follows and, in part, will be obvious from the description, or may be learned by practice of the general inventive concept.

In accordance with one feature of the present general inventive concept, a supporting device of a display apparatus to fix the display apparatus to a wall includes a first supporting unit coupled to the display apparatus, a second supporting unit fixed to the wall such that the second supporting unit is coupled to the first supporting unit, and a position adjustment unit to move the display apparatus in three axis directions.

The position adjustment unit may include a first position adjustment unit to move the display apparatus in a horizontal axis direction.

The first position adjustment unit may include a hook provided at the first supporting unit and an upper supporting part provided at the second supporting unit, and the hook may be caught by the supporting part such that the hook slides along the supporting part.

The position adjustment unit may include a second position adjustment unit to move the display apparatus in a vertical axis direction.

The second position adjustment unit may include a first coupling screw fixed to the display apparatus and a first adjustment screw to move the first coupling screw.

The first supporting unit may include a vertical axis long hole in which the first coupling screw moves in the vertical axis direction.

The position adjustment unit may include a third position adjustment unit to move the display apparatus in a height axis direction.

The third position adjustment unit may include a supporting part to support the first supporting unit and a second adjustment screw to move the supporting part.

The second supporting unit may include a height axis long hole in which the supporting part moves in the height axis direction.

The first supporting unit may include a hook having an opening and a separation preventing part to close at least a portion of the opening.

The supporting device may include a plurality of supporting devices to support a plurality of display apparatuses, and height differences between the display apparatuses may be adjusted by the position adjustment unit.

The supporting device may further include a horizontal axis connection unit to connect the supporting devices in a horizontal axis direction.

The horizontal axis connection unit may maintain a plurality of second supporting units at a predetermined interval in the horizontal axis direction.

The supporting device may further include a vertical axis connection unit to arrange the supporting devices in a vertical axis direction.

The vertical axis connection unit may maintain a plurality of second supporting units at a predetermined interval in the vertical axis direction.

The supporting device may further include a supporter to support the first supporting unit such that a predetermined distance is maintained between the display apparatus and the wall in a state in which the display apparatus is rotated.

In accordance with another feature of the present general inventive concept, a supporting device of a display apparatus to fix the display apparatus to a wall includes a first supporting unit coupled to the display apparatus, a second supporting unit to which the first supporting unit is rotatably coupled, and a supporter selectively coupled to the first supporting unit to adjust a distance between the display apparatus and the wall.

The supporter may be rotatably provided at the second supporting unit.

The supporter may support the first supporting unit such that a predetermined distance is maintained between the display apparatus and the wall in a state in which the display apparatus is rotated.

The supporting device may further include a position adjustment unit to move the display apparatus in three axis directions.

In accordance with a further feature of the present general inventive concept, a supporting device of a plurality of display apparatuses includes a plurality of first supporting units coupled to the display apparatuses, a plurality of second supporting units coupled to the first supporting units to arrange the display apparatuses at a wall in a horizontal or vertical direction, and a plurality of position adjustment units to adjust height differences between the display apparatuses.

In yet another feature of the present general inventive concept, a supporting device to support a plurality of display apparatuses includes a combination unit coupled to the plurality of display apparatuses and the wall to support the plurality of display apparatus in a first position against the wall, and at least one position adjustment unit coupled to the combination unit to position at least one display apparatus among the plurality of display apparatuses in a second position different from the first position to define an opening between the wall and a rear of the display apparatus.

BRIEF DESCRIPTION OF THE DRAWINGS

These and/or other features of the general inventive concept will become apparent and more readily appreciated from the following description of the exemplary embodiments, taken in conjunction with the accompanying drawings of which.

DETAILED DESCRIPTION OF THE EMBODIMENTS

Figure 1:
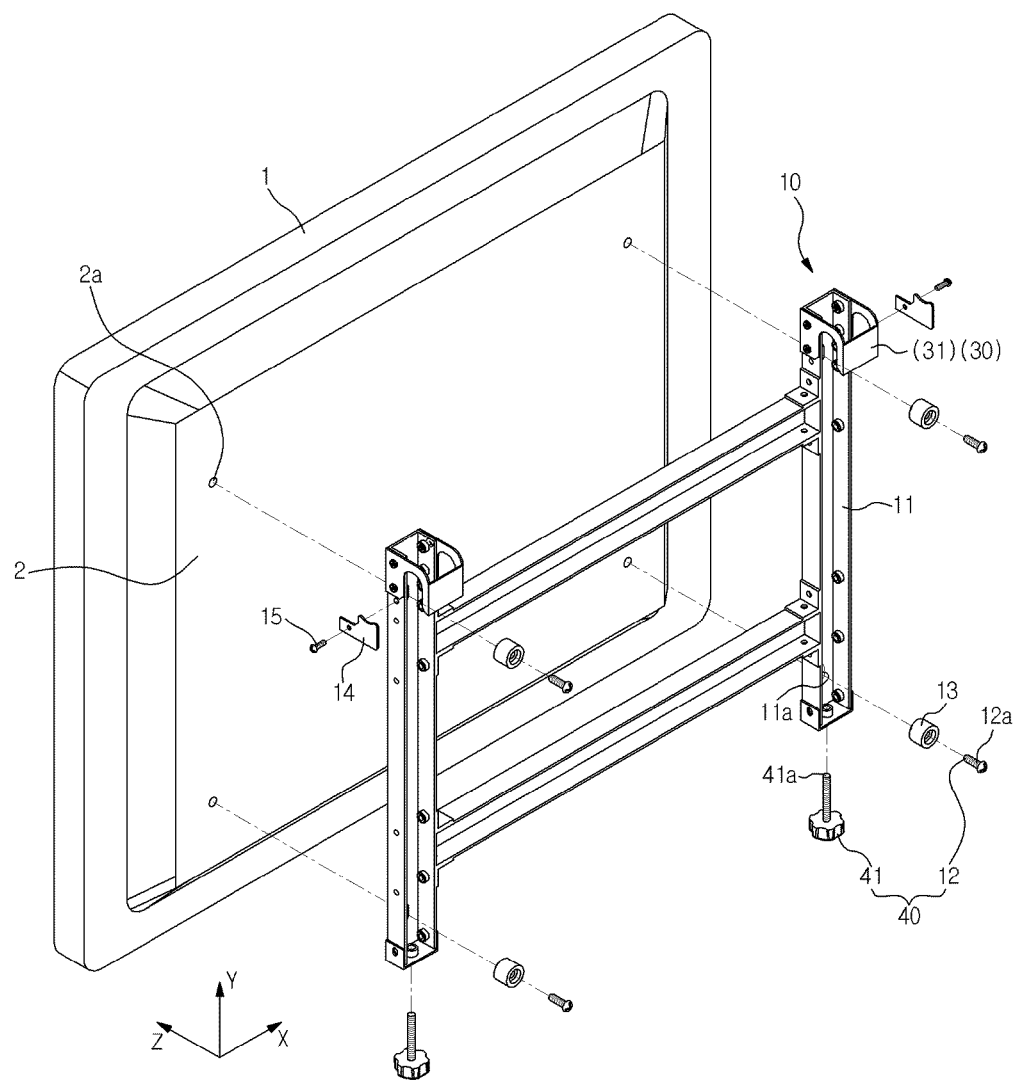
FIG. 1 is a perspective view illustrating a first supporting unit, according to an exemplary embodiment of the present general inventive concept, before the first supporting unit is coupled to a display apparatus.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
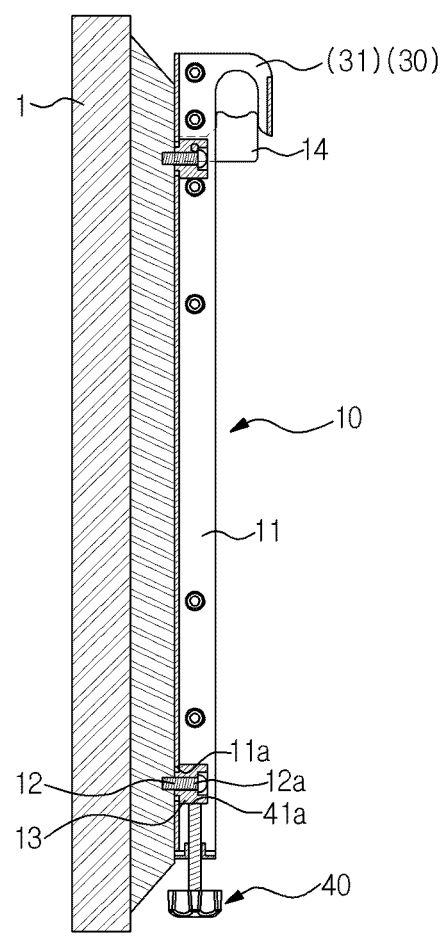
FIG. 2 is a sectional view illustrating coupling between the first supporting unit and the display apparatus.
Figure 3:
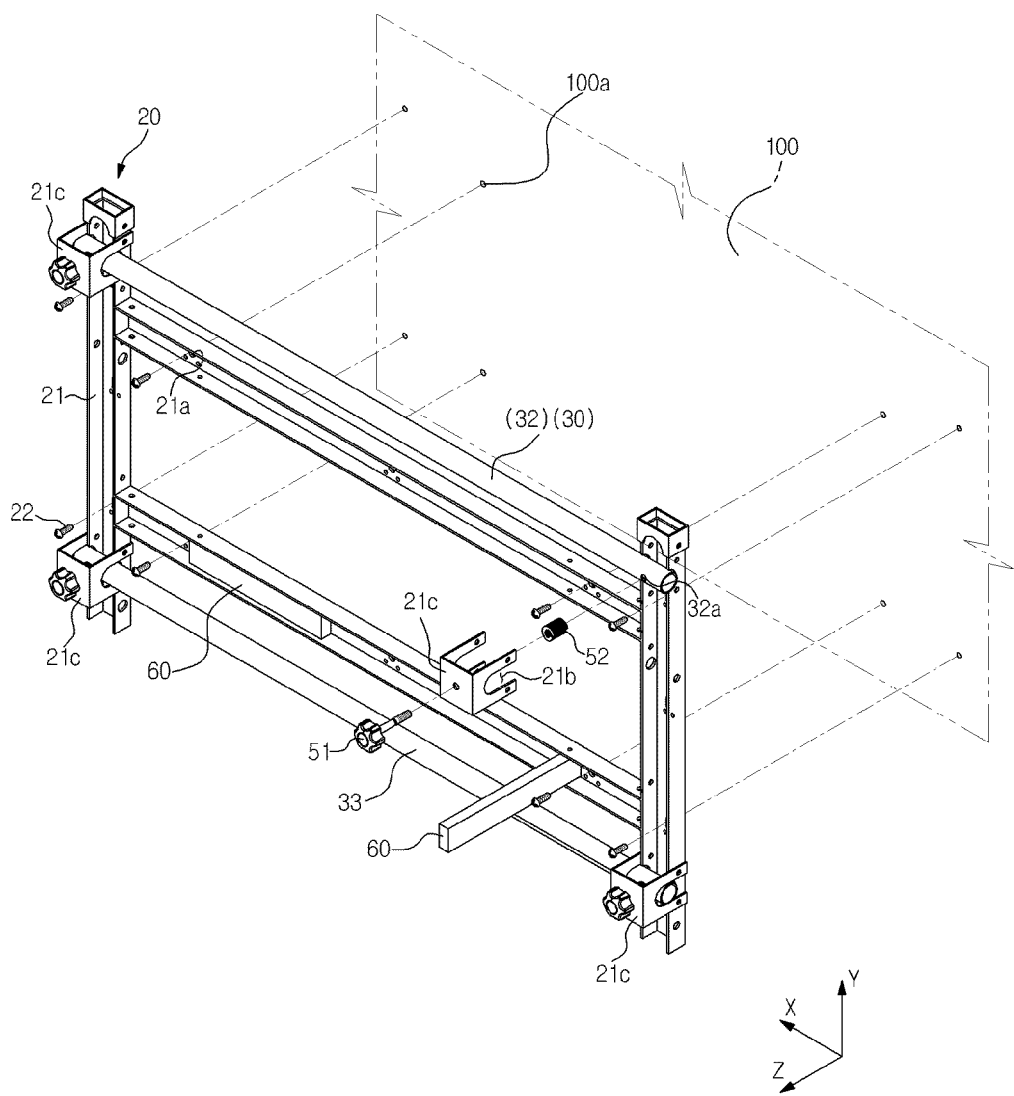
FIG. 3 is a perspective view illustrating a second supporting unit, according to an exemplary embodiment of the present general inventive concept, before the second supporting unit is coupled to a wall.
Figure 4:
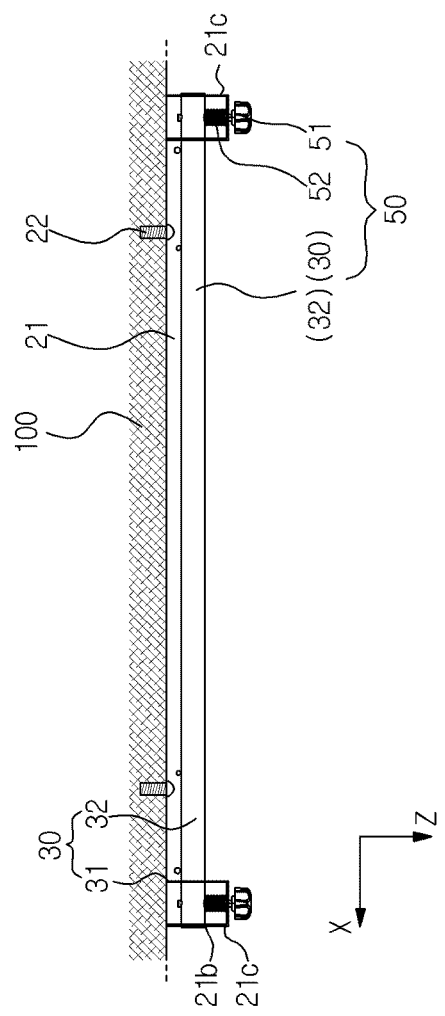
FIG. 4 is a plan view illustrating coupling between the second supporting unit and the wall.

FIG. 1 is a perspective view illustrating a first supporting unit, according to an exemplary embodiment of the present general inventive concept, before the first supporting unit is coupled to a display apparatus. FIG. 2 is a sectional view illustrating coupling between the first supporting unit and the display apparatus. FIG. 3 is a perspective view illustrating a second supporting unit, according to an exemplary embodiment of the present general inventive concept, before the second supporting unit is coupled to a wall. FIG. 4 is a plan view illustrating coupling between the second supporting unit and the wall.

As shown in FIGS. 1 to 4, a supporting device of a display apparatus may include a first supporting unit 10 coupled to a display apparatus 1, a second supporting unit 20 mounted to a wall 100, and position adjustment units 30, 40 and 50 to move the display apparatus 1.

The display apparatus 1 may be provided at a rear 2 thereof with a plurality of holes 2a. The holes 2a may be formed at arbitrary positions of the rear 2 of the display apparatus 1. For example, as shown in FIG. 1, the holes 2a may be formed adjacent to four corners of the rear 2 of the display apparatus 1.

Meanwhile, the holes 2a of the display apparatus 1 may be perpendicularly depressed at arbitrary positions of the rear 2 of the display apparatus 1. Alternatively, the display apparatus 1 may include video electronics standards association (VESA) holes formed at the rear 2 of the display apparatus 1 according to VESA wall mount standards. When using such VESA holes, the first supporting unit 10 may be fixed to the rear 2 of the display apparatus 1 without forming additional holes at the display apparatus 1.

The first supporting unit 10 may include a first supporting frame 11, a plurality of first coupling screws 12, and a plurality of holders 13. Also, the first supporting unit 10 may include a separation preventing part 14 and a fixing screw 15 to fix the separation preventing part 14 to the first supporting frame 11.

The first supporting frame 11 may be provided with a plurality of vertical axis long holes 11a. The first coupling screws 12 may be coupled to the holes 2a of the display apparatus 1 through the holders 13 and the vertical axis long holes 11a. Consequently, the first supporting frame 11 may be fixed to the rear 2 of the display apparatus 1 by the first coupling screws 12.

The holders 13 may be larger than the vertical axis long holes 11a. The holders 13 may prevent rear ends 12a of the first coupling screws 12 from passing through the vertical axis long holes 11a such that the first coupling screws 12 may be movable in the vertical axis long holes 11a. The display apparatus 1 may be coupled to the first supporting frame 11 such that the display apparatus 1 may move relative to the first supporting frame 11 by the first coupling screws 12 and the vertical axis long holes 11a.

Referring to FIG. 3, the second supporting unit 20 may include a second supporting frame 21 and a plurality of second coupling screws 22.

The second supporting frame 21 may be provided with a plurality of coupling holes 21a. The second coupling screws 22 may be coupled to a plurality of wall holes 100a of the wall 100 through the coupling holes 21a such that the second supporting frame 21 is mounted to the wall 100. The wall holes 100a may be formed at the wall 100 using a drill (not shown), or any other method of forming the wall holes 100a at the wall.

A plurality of position adjustment units 30, 40 and 50 may be configured to move the display apparatus 1 in three axis directions (X, Y and Z). The position adjustment units 30, 40 and 50 may include a first position adjustment unit 30 to move the display apparatus 1 in a horizontal axis (X) direction, a second position adjustment unit 40 to move the display apparatus 1 in a vertical axis (Y) direction, and a third position adjustment unit 50 to move the display apparatus 1 in a height axis (Z) direction.

The first position adjustment unit 30 may include a hook 31 of the first supporting unit 10 and an upper supporting part 32 of the second supporting unit 20.

The hook 31 may be formed at the upper side of the first supporting frame 11, and the upper supporting part 32 may be formed at the upper side of the second supporting frame 21. The hook 31 may engage the upper supporting part 32 (see FIGS. 8 and 9) to be coupled thereto.

The hook 31 may slide along the upper supporting part 32 in a state in which the hook 31 is caught by the upper supporting part 32, with the result that the display apparatus 1 supported by the first supporting frame 11 may be reciprocated in the horizontal axis (X) direction. Consequently, a user or an engineer may move the display apparatus 1 in the horizontal axis (X) direction through the first position adjustment unit 30 to adjust the position of the display apparatus 1.

On the other hand, the first supporting frame 11 may pivotably support the hook 31 such that one end of the display apparatus 1 may be pivoted. That is, the first supporting frame 11 may be rotated about the upper supporting part 32 in a state in which the hook 31 is supported by the upper supporting part 32, with the result that the distance between the side of the display apparatus 1 opposite the hook 31 and the wall 100 may be increased (see FIGS. 13 and 14).

The second supporting frame 21 may be provided with a supporter 60 to selectively support the first supporting frame 11. The supporter 60 may include an end that is pivotably mounted at the second supporting frame 21 to swing the supporter 60 into various positions along the horizontal axis (X). A user or an engineer may erect the supporter 60 such that the supporter 60 is connected to the first supporting frame 11, and therefore, the first supporting frame 11 is supported by the supporter 60. Also, the user or the engineer may fold the supporter 60 against the second supporting unit 20 such that the supporter 60 is separated from the first supporting frame 11. Accordingly, the first supporting frame 11 is not supported by the supporter 60 while the supporter 60 is in the folded position.

The second position adjustment unit 40 may include a first coupling screw 12 and a first adjustment screw 41.

The first coupling screw 12 may be rotatably inserted into the corresponding vertical axis long hole 11a of the first supporting frame 11 through a holder 13. Specifically, a rear end 12a of the first coupling screw 12 may protrude from the vertical axis long hole 11a due to the holder 13. The rear end 12a may be supported by the first adjustment screw 41.

The first adjustment screw 41 may be threadedly coupled to the first supporting frame 11 to move while rotating in the forward direction or in the reverse direction. For example, as shown in FIG. 1, the first adjustment screw 41 is mounted vertically to move in the vertical axis (Y) direction. Also, the first adjustment screw 41 may be provided at each side of the first supporting frame 11.

An upper end 41a of the first adjustment screw 41 may support the rear end 12a of the first coupling screw 12. Since the first coupling screw 12 is coupled to the display apparatus 1, the first coupling screw 12 may move along with the display apparatus 1. The first adjustment screw 41 may press the first coupling screw 12 or may be separated from the first coupling screw 12 to move the display apparatus 1.

A user or an engineer may rotate the first adjustment screw 41 in the forward direction such that the upper end 41a of the first adjustment screw 41 presses the rear end 12a of the first coupling screw 12 via the holder 13. As a result, the first coupling screw 12 may move upward along the corresponding vertical axis long hole 11a.

When the user or the engineer rotates the first adjustment screw 41 in the reverse direction, the upper end 41a of the first adjustment screw 41 may be separated from the rear end 12a of the first coupling screw 12. Consequently, the first coupling screw 12 may move downward along the corresponding vertical axis long hole 11a due to the weight of the display apparatus 1, with the result that the rear end 12a of the first coupling screw 12 may be supported at the upper end 41a of the first adjustment screw 41.

As a result, the first adjustment screw 41 may move the display apparatus 1 in the vertical axis (Y) direction to adjust the position of the display apparatus 1.

Referring now to FIGS. 3 and 4, the third position adjustment unit 50 may include supporting parts 32 and 33, a second adjustment screw 51, and a movement preventing spring 52.

The supporting parts 32 and 33 may include an upper supporting part 32 provided at the upper side of the second supporting frame 21 and a lower supporting part 33 provided at the lower side of the second supporting frame 21. A support bracket 21c may be coupled to the second supporting frame 21 to support the supporting parts 32 and 33, as discussed in greater detail below. The hook 31 of the first supporting unit 10 may be caught by the upper supporting part 32. The first supporting frame 11 may be simply supported by the lower supporting part 33. The upper supporting part 32 and the lower supporting part 33 are identical to each other except for installation positions thereof. Therefore, the terms "the supporting parts 32 and 33" will be used in the following description as long as the upper supporting part 32 and the lower supporting part 33 are not particularly distinguished from each other.

The supporting parts 32 and 33 may be movably mounted at the second support frame 21. Opposite ends of the supporting parts 32 and 33 may be inserted into height axis long holes 21b of the support brackets 21c. The height axis long holes 21b defined by the support brackets 21c allow the support parts 32 and 22 to move in the height axis (Z) direction between the second supporting frame 21 and the support brackets 21c, as discussed below. Also, the supporting parts 32 and 33 may be formed in a cylindrical shape, but are not limited thereto.

The second adjustment screw 51 may be disposed through a hole in the support bracket 21c to rotate in the forward direction or in the reverse direction. For example, as shown in FIG. 3, the second adjustment screw 51 may be disposed to move in a frontward-and-rearward direction.

Based on the manipulation of the second adjustment screw 51 the supporting parts 32 and 33 may be adjusted in the height axis (Z) direction. Specifically, the movement preventing spring 52 is disposed between the support bracket 21c and the support parts 32 and 33. The second adjustment screw 51 may be disposed through the movement preventing spring 52 and coupled to a thread groove 32a corresponding to one of the supporting parts 32 and 33. At this time, the movement preventing spring 52 may elastically support one of the supporting parts 32 and 33 such that the second adjustment screw 51 is threadedly coupled to the thread groove 32a of the corresponding one of the supporting parts 32 and 33. The movement preventing spring 52 biases the support parts 32 and 33 in a first steady-state position.

As the second adjustment screw 51 is rotated in a first direction, e.g., a forward direction, the movement preventing spring 52 compresses, and moves the supporting parts 32 and 33 in a first direction along the height axis (Z) direction. Alternatively, when the second adjustment screw 51 is rotated in a second direction, e.g., a reverse direction, the movement preventing spring 52 decompresses and moves the supporting parts 32 and 33 in a second direction along the height axis (Z) direction such that the supporting parts may return to the steady-state position. Accordingly, the supporting parts 32 and 33 may be reciprocated along the height axis long holes 21b in the height axis (Z) direction through rotation of the second adjustment screw 51 in the forward direction or in the reverse direction. Upon movement of the upper supporting part 32, the upper side of the display apparatus 1 may move in the height axis (Z) direction. Upon movement of the lower supporting part 33, the lower side of the display apparatus 1 may move in the height axis (Z) direction.

Figure 5:
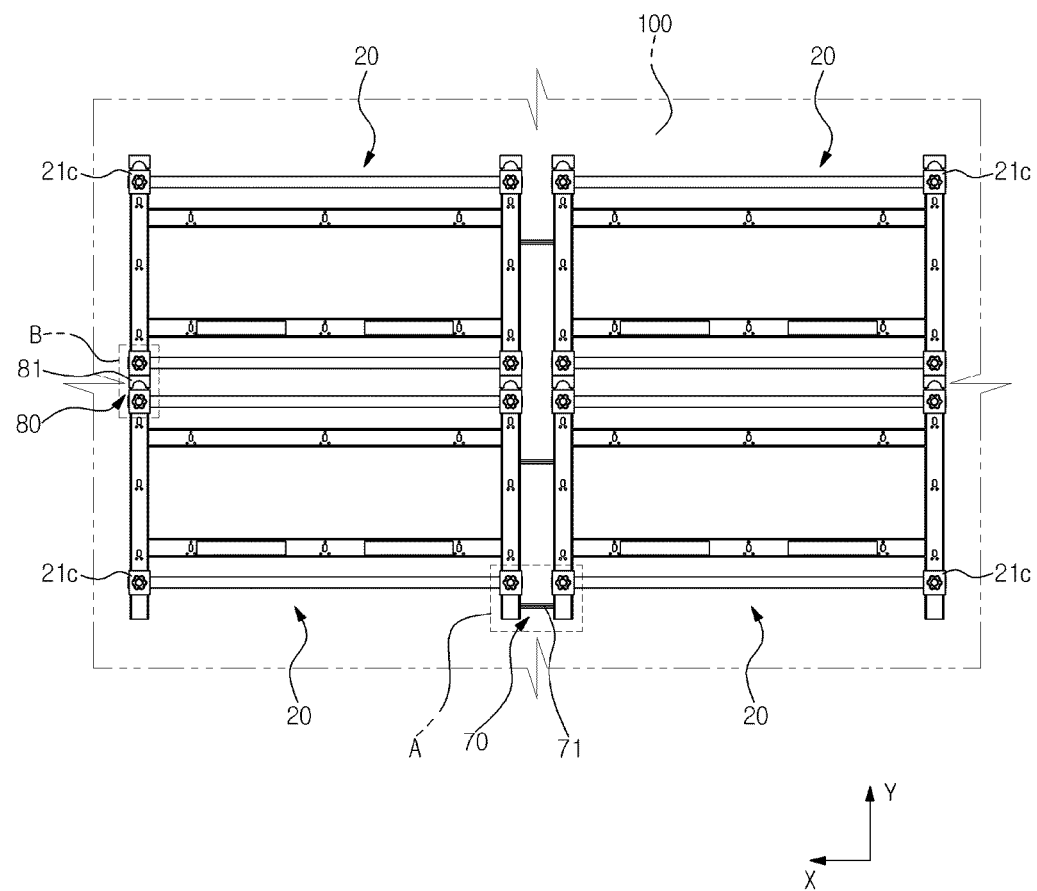
FIG. 5 is a front view illustrating a plurality of second supporting units mounted to the wall.
Figure 6:
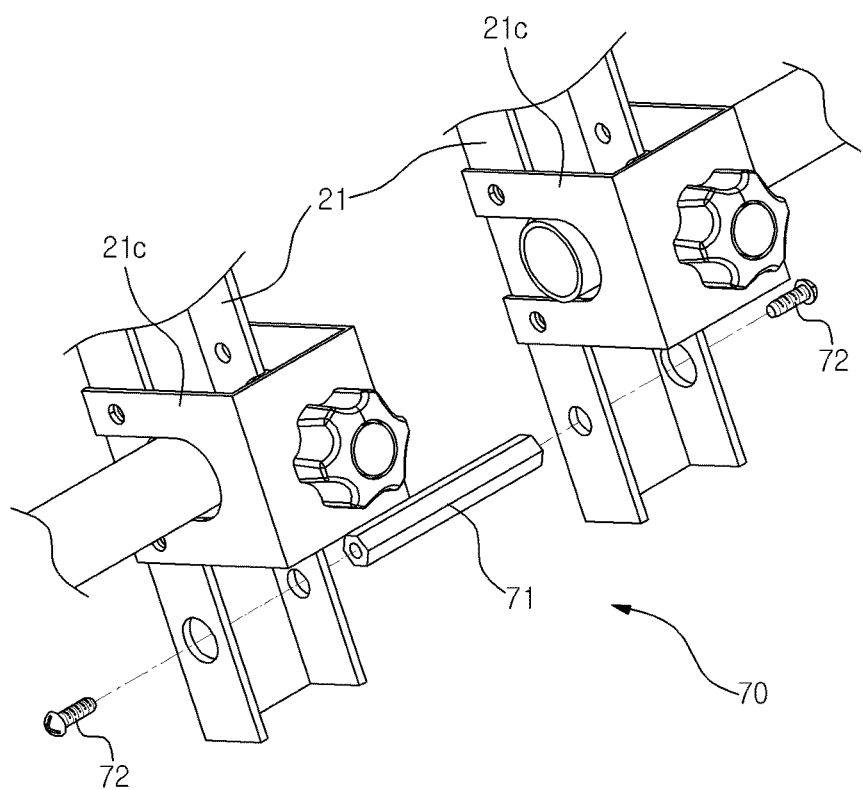
FIG. 6 is an enlarged view of part A of FIG. 5 illustrating a horizontal axis connection unit in an exploded perspective view.
Figure 7:
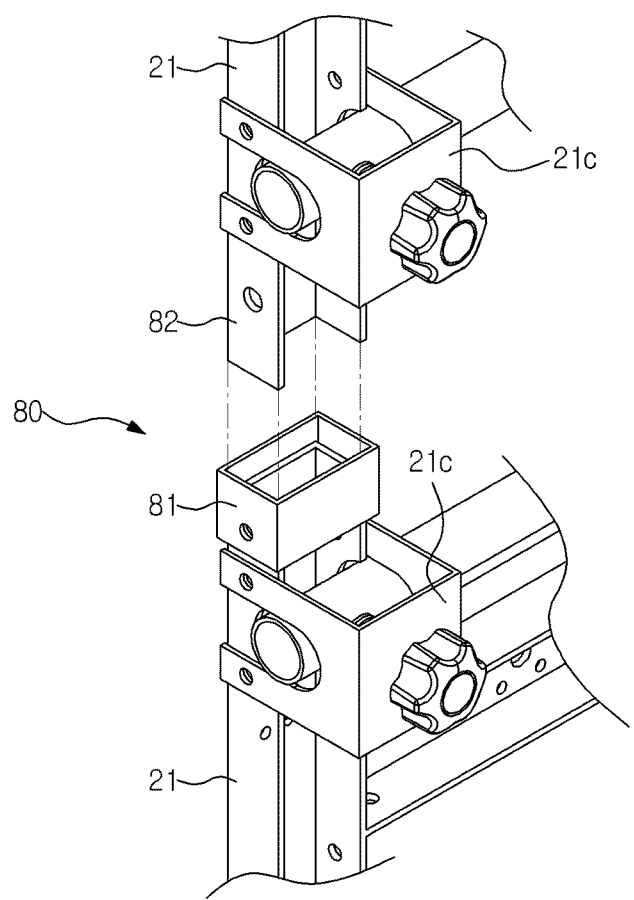
FIG. 7 is an enlarged view of part B of FIG. 5 illustrating a vertical axis connection unit in an exploded perspective view.

FIG. 5 is a front view illustrating a plurality of second supporting units mounted to the wall to construct a video wall. FIG. 6 is an enlarged view of part A of FIG. 5 illustrating a horizontal axis connection unit in an exploded perspective view. FIG. 7 is an enlarged view of part B of FIG. 5 illustrating a vertical axis connection unit in an exploded perspective view.

As shown in FIGS. 1 to 14, a plurality of display apparatuses 1 may be provided to construct a video wall. To this end, a plurality of second supporting units 20 may be mounted on the wall 100. For example, as shown in FIG. 5, the second supporting units 20 may be disposed in a 2×2 matrix. It can be appreciated, however, that the second supporting units 20 may be disposed in various different matrices.

The second supporting units 20 may be connected to one another in the horizontal axis (X) direction or in the vertical axis (Y) direction. Specifically, the second supporting units 20 may be arranged at a regular interval. To this end, a horizontal axis connection unit 70 and a vertical axis connection unit 80 may be provided.

Referring to FIG. 6, the horizontal axis connection unit 70 may include a plate 71 and plate fixing screws 72 to fix the plate 71.

The plate 71 may have a regular length such that the distance between neighboring second supporting frames 21 may be regularly maintained. The left end of the plate 71 may be fixed to a left one of the second supporting frames 21 by a corresponding one of the plate fixing screws 72. The right end of the plate 71 may be fixed to a right one of the second supporting frames 21 by a corresponding one of the plate fixing screws 72. As a result, the second supporting frames 21 may be arranged at a regular interval in the horizontal axis (X) direction.

Referring to FIG. 7, the vertical axis connection unit 80 may include a vertical axis receiving part 81 and a vertical axis inserting part 82.

The vertical axis receiving part 81 may be formed at the upper part of a corresponding one of the second support frames 21, and the vertical axis inserting part 82 may be formed at the lower part of a corresponding one of the second support frames 21. When the second support frames 21 are mounted in the vertical axis (Y) direction, the vertical axis inserting part 82 of an upper one of the second support frames 21 may be inserted into the vertical axis receiving part 81 of a lower one of the second support frames 21. As a result, the second support frames 21 may be arranged at a regular interval in the vertical axis (Y) direction.

Hereinafter, a process of fixing a display apparatus to a wall using the supporting device of the display apparatus with the above-stated construction will be described.

Figure 8:
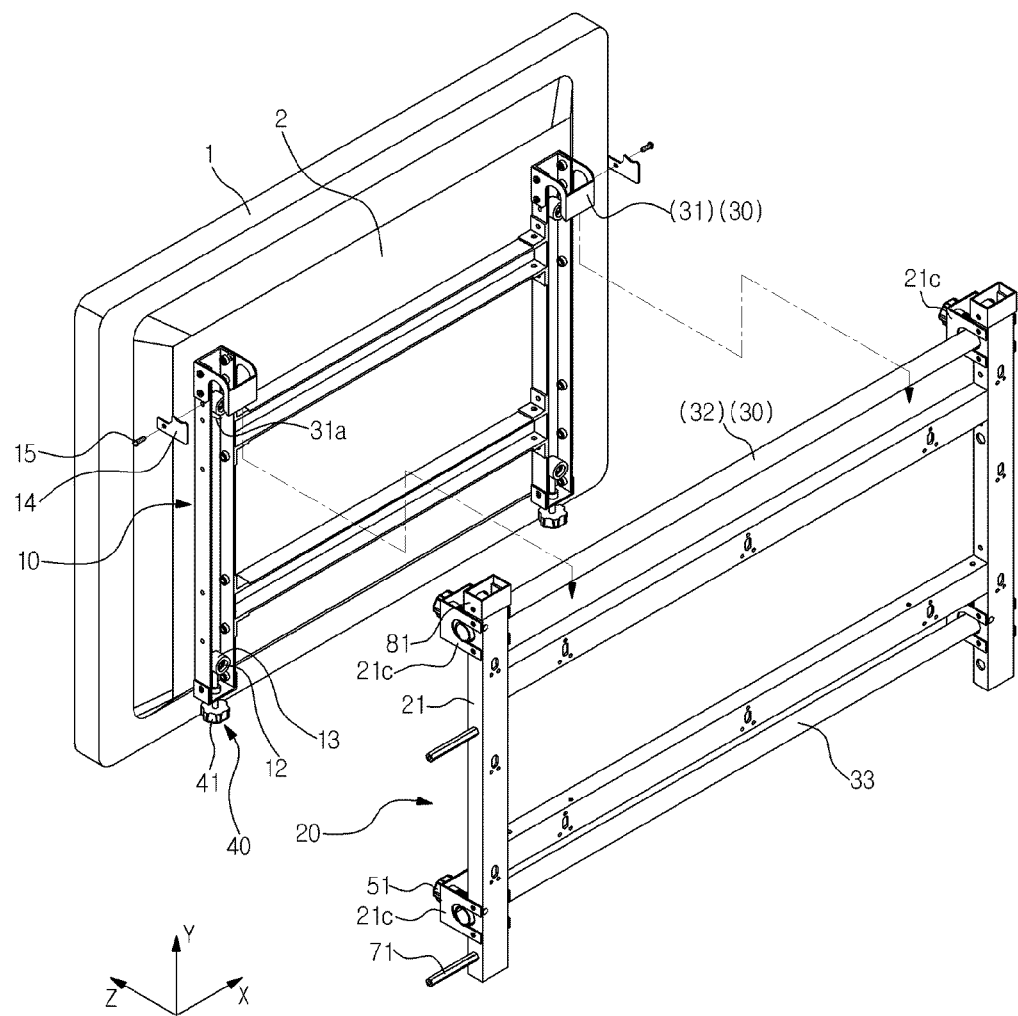
FIG. 8 is a perspective view illustrating coupling between a display apparatus, according to an exemplary embodiment of the present general inventive concept, and a wall.
Figure 9:
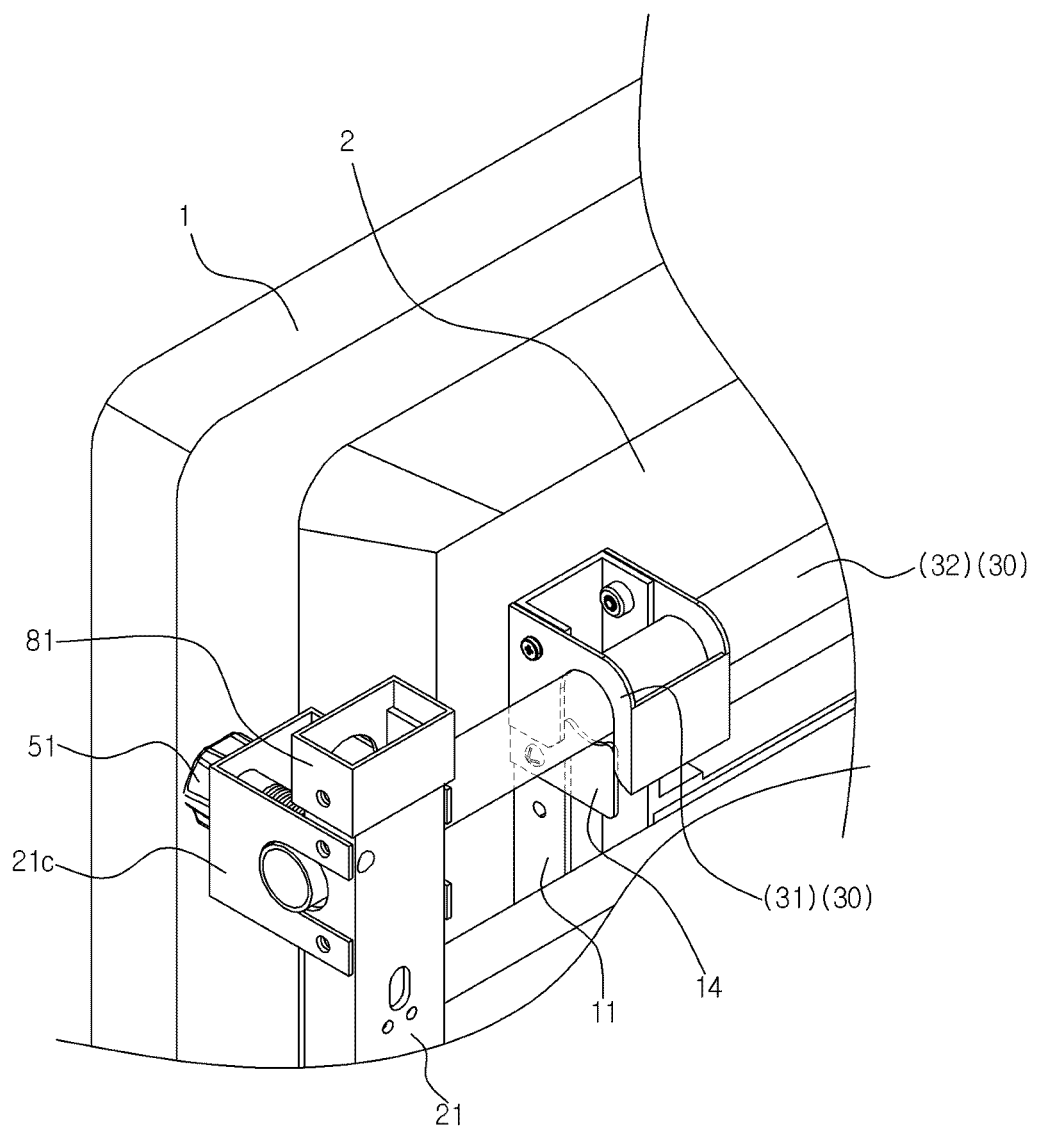
FIG. 9 is a perspective view illustrating a separation preventing part according to an exemplary embodiment of the present general inventive concept.

FIG. 8 is a perspective view illustrating coupling between a display apparatus, according to an exemplary embodiment of the present general inventive concept, and a wall. FIG. 9 is a perspective view illustrating a separation preventing part according to an exemplary embodiment of the present general inventive concept.

As shown in FIGS. 1 to 9, the first supporting unit 10 may be coupled to the second supporting unit 20 to fix the display apparatus 1 to the wall.

More specifically, the hook 31 of the first supporting unit 10 may be provided at the upper side thereof with an opening 31a, through which the hook 31 of the first supporting unit 10 may be caught by the upper supporting part 32 of the second supporting unit 20. The display apparatus 1 may be simply fixed to the wall 100 using the supporting device of the display apparatus 1.

Meanwhile, the hook 31 may be easily separated from the upper supporting part 32 through the opening 31a in a state in which the hook 31 is caught by the upper supporting part 32. The separation preventing part 14 may be provided to prevent the hook 31 from being separated from the upper supporting part 32. More specifically, the separation preventing part 14 may be fixed to the first supporting frame 11 by the fixing screw 15. The separation preventing part 14 may be disposed at the bottom of the upper supporting part 32 to close at least a portion of the opening 31a of the hook 31. Since the hook 31 is prevented from being separated from the upper supporting part 32 by the separation preventing part 14, the display apparatus 1 is prevented from falling off the wall 100 due to external impact.

Figure 10:
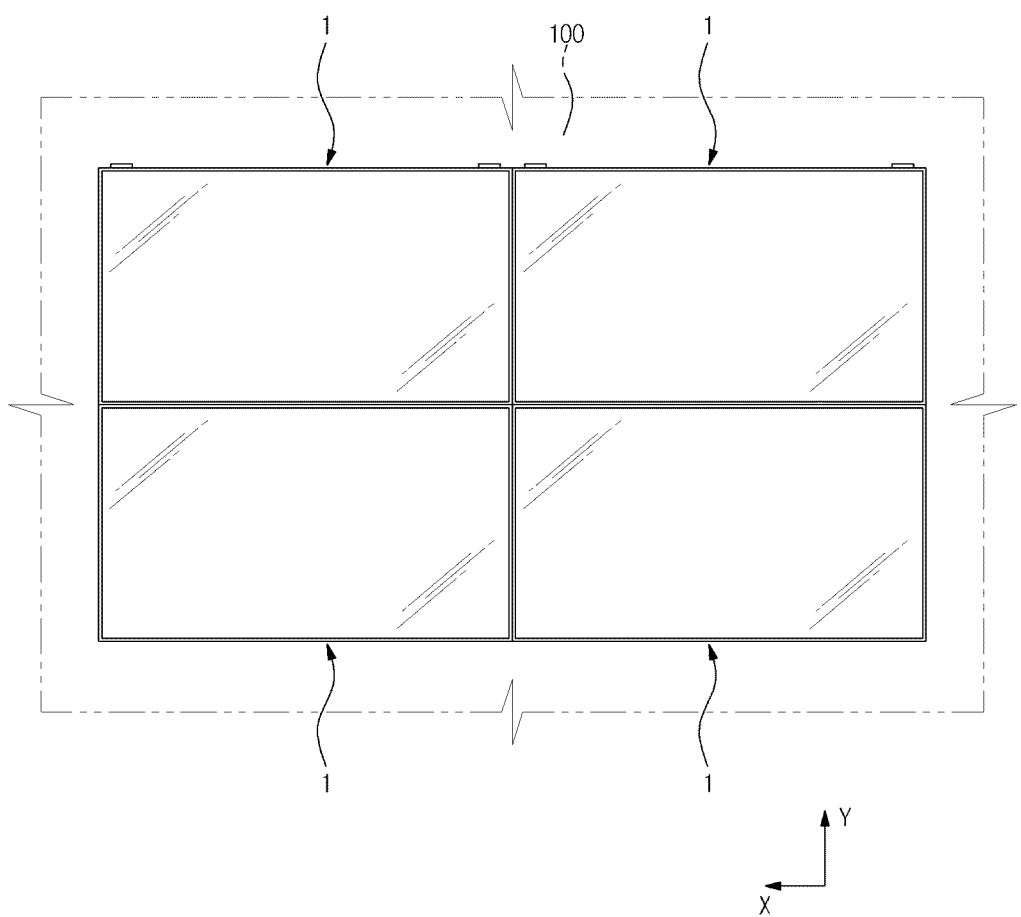
FIG. 10 is a front view illustrating a plurality of display apparatuses mounted to the wall to construct a video wall.
Figure 11:
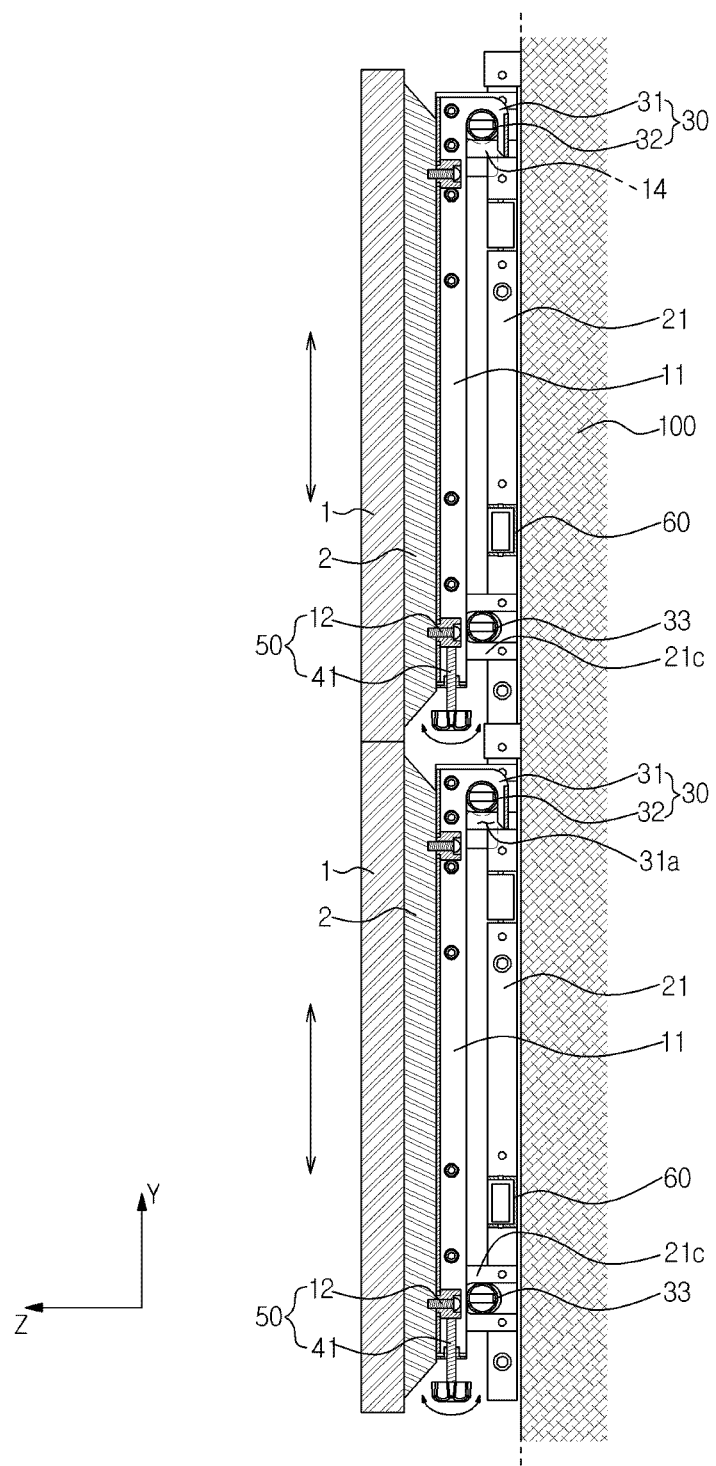
FIG. 11 is a sectional view illustrating micro adjustment using a second position adjustment unit according to an exemplary embodiment of the present general inventive concept.
Figure 12:
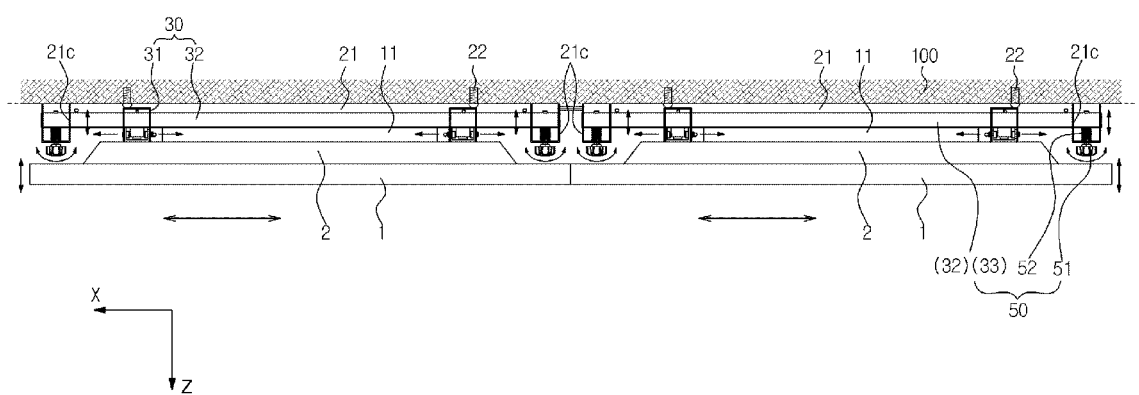
FIG. 12 is a plan view illustrating micro adjustment using a first position adjustment unit and a third position adjustment unit according to an exemplary embodiment of the present general inventive concept.

FIG. 10 is a front view illustrating a plurality of display apparatuses mounted to the wall. FIG. 11 is a sectional view illustrating micro adjustment using a second position adjustment unit according to an exemplary embodiment of the present general inventive concept. FIG. 12 is a plan view illustrating micro adjustment using a first position adjustment unit and a third position adjustment unit according to an exemplary embodiment of the present general inventive concept.

As shown in FIGS. 1 to 12, a plurality of display apparatuses 1 may be fixed to the wall 100 by a plurality of supporting devices to construct a video wall. However, the display apparatuses 1 may be misaligned due to assembly tolerance caused when the first supporting unit 10 is coupled to the display apparatus 1, assembly tolerance caused when the second supporting unit 20 is mounted to the wall 100, or errors cause when the second supporting units 20 are arranged horizontally and vertically using the horizontal axis connection unit 70 and the vertical axis connection unit 80. In at least one exemplary embodiment, the display apparatuses 1 may be correctly aligned using the position adjustment units 30, 40 and 50.

The first position adjustment unit 30 may move the display apparatus 1 in the horizontal axis (X) direction. The first position adjustment unit 30 may include the hook 31 of the first supporting unit 10 and the upper support part 32 of the second supporting unit 20. The hook 31 may slide along the upper support part 32. Consequently, a user or an engineer may push or pull the display apparatus 1 in the horizontal axis (X) direction to move the display apparatus 1 in the horizontal axis (X) direction and thus change the position of the display apparatus 1. As a result, the first position adjustment unit 30 may adjust the horizontal arrangement of the display apparatuses 1.

Also, the second position adjustment unit 40 may move the display apparatus 1 in the vertical axis (Y) direction. The second position adjustment unit 40 may include the first coupling screw 12 and the first adjustment screw 41. The first adjustment screw 41 may move the first coupling screw 12 coupled to the display apparatus 1. Consequently, the user or the engineer may rotate the first adjustment screw 41 in the forward direction or in the reverse direction to move the display apparatus 1 in the vertical axis (Y) direction and thus change the position of the display apparatus 1. As a result, the second position adjustment unit 40 may adjust the vertical arrangement of the display apparatuses 1.

Also, the third position adjustment unit 50 may move the display apparatus 1 in the height axis (Z) direction. The third position adjustment unit 50 may include the supporting parts 32 and 33 and the second adjustment screw 51. The second adjustment screw 51 may move the supporting parts 32 and 33 in the height axis (Z) direction. Consequently, the user or the engineer may rotate the second adjustment screw 51 in the forward direction or in the reverse direction to move the display apparatus 1 in the height axis (Z) direction and thus change the position of the display apparatus 1. As a result, the third position adjustment unit 50 may adjust height differences between the display apparatuses 1.

Figure 13:
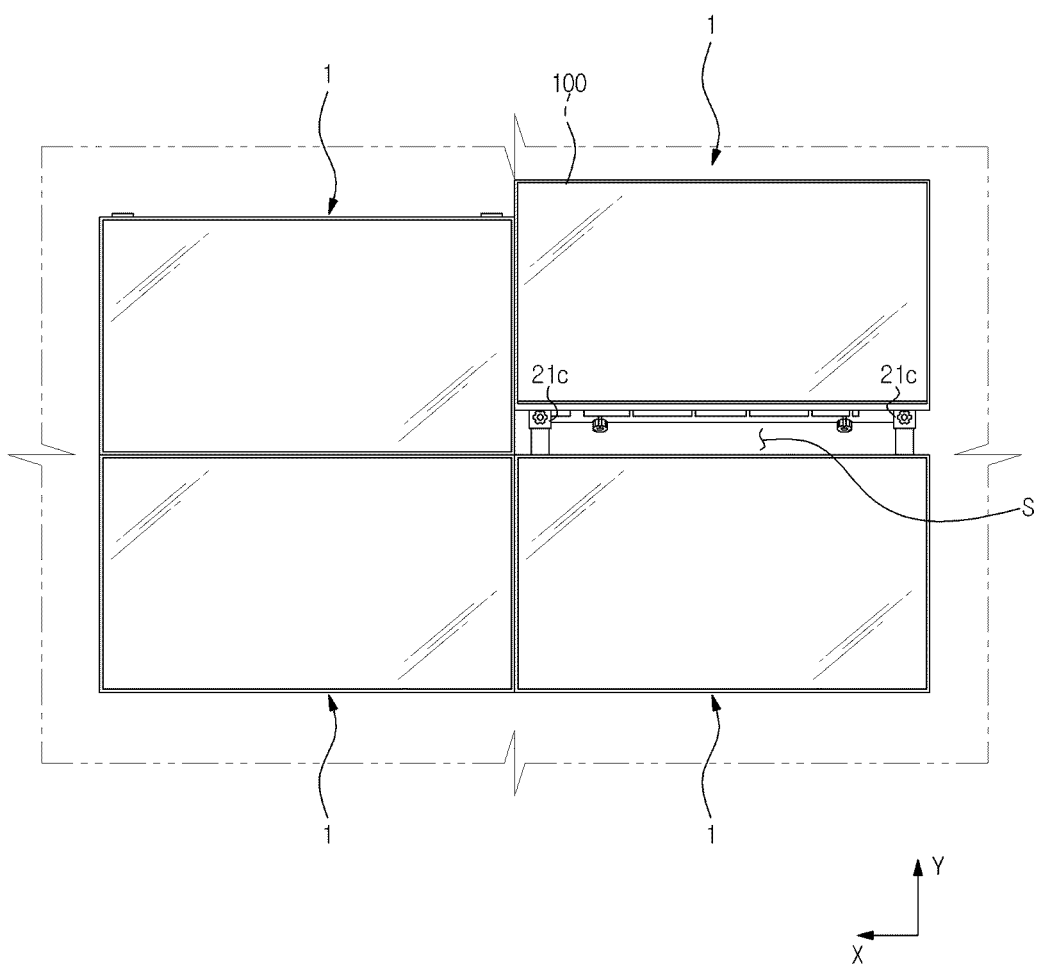
In FIG. 13 is a front view illustrating a supporter, according to an exemplary embodiment of the present general inventive concept, supporting the first supporting unit.
Figure 14:
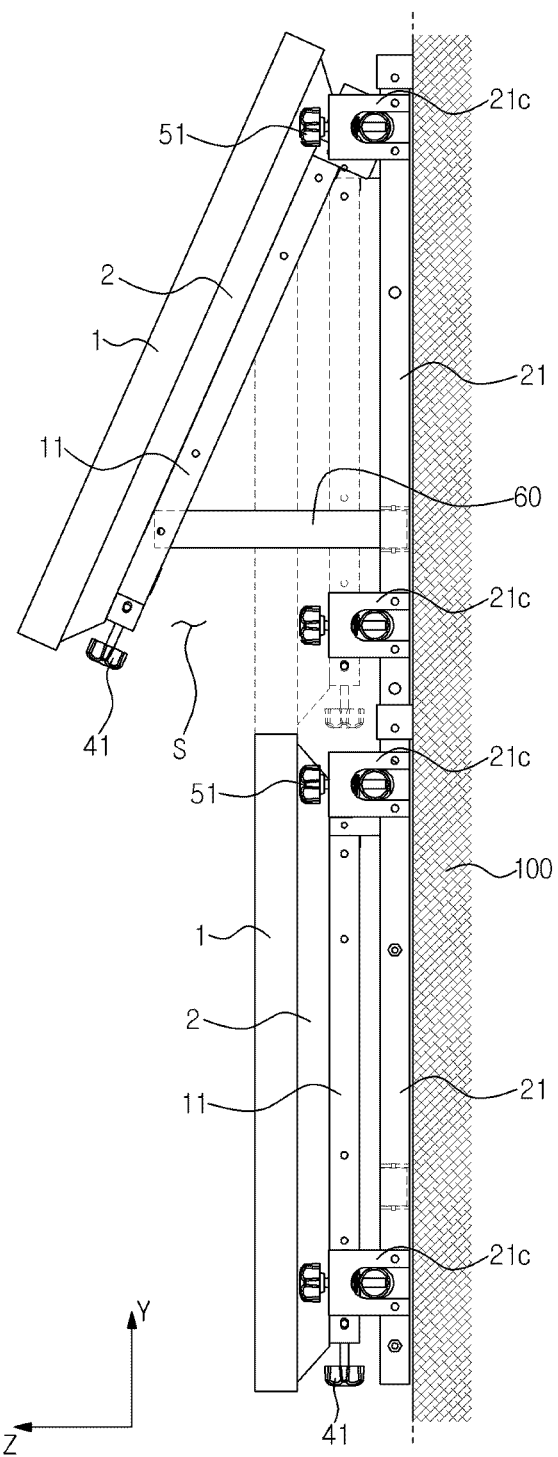
FIG. 14 is a side view illustrating the supporter supporting the first supporting unit.

FIG. 13 is a front view illustrating a supporter, according to an exemplary embodiment of the present general inventive concept, supporting the first supporting unit. FIG. 14 is a side view illustrating the supporter supporting the first supporting unit.

Referring to FIGS. 13 and 14, a supporting device, according to the general inventive concept may support a plurality of display apparatuses. At least one exemplary embodiment illustrated in FIGS. 13 and 14 may arrange the display apparatuses 1 in a vertical manner, with one display apparatus 1 positioned on top of another. As discussed in detail above, a plurality of first support units 10 can be coupled to a plurality of second support units 20 to support the plurality of display apparatus 1 in a first position against the wall 100. At least one position adjustment unit 30, 40 and/or 50 coupled either the first support units 10 or the second support units 20, respectively, may move one of the display apparatuses 1 in a second position different from the first position.

For example, the combination of the hook 31 included with the first supporting unit 10 and the upper supporting part 32 included with the second supporting unit 20 provides a pivoting position adjustment unit 30. Accordingly, one side of the display apparatus 1 may pivot such that the display apparatus 1 may be adjusted between the first and second positions, as illustrated in FIGS. 10-14. As the display apparatus 1 is adjusted from the first position into the second position, an opening located incident the pivot unit increases to provide a work space (S).

When the second position adjustment unit 40 is manipulated to move upper ones of the display apparatuses 1 in the vertical axis (Y) direction, working spaces (S) may not be secured by lower ones of the display apparatuses 1. Also, when lower ones of the display apparatuses 1 are separated from the wall 100 to replace or repair the lower ones of the display apparatuses 1, working spaces (S) may not be secured by upper ones of the display apparatuses 1. Accordingly, the supporter 60 may be provided to maintain the distance between each of the display apparatuses 1 and the wall 100.

The supporter 60 may be pivotably mounted to the second supporting frame 21. After the rotation of the display apparatus 1, the supporter 60 may be erected to support the first supporting frame 11. As a result, the working space (S) may be provided between the corresponding display apparatus 1 and the wall 100.

A user or an engineer may manipulate the second adjustment screw 41 to move an upper one of the display apparatuses 1 in the vertical axis (Y) direction and to separate a lower one of the display apparatuses 1 from the wall.

Meanwhile, cables may be connected to the rear 2 of the upper one of the display apparatuses 1 or the upper one of the display apparatuses 1 may be repaired through the working space S without separation of the upper one of the display apparatuses 1.

As is apparent from the above description, the supporting device of the display apparatus 1 may accurately align the display apparatus 1 and adjust height differences between the display apparatuses 1 through micro adjustment.

Also, the display apparatus 1 may be easily separated and replaced or repaired, thereby reducing management expenses of the display apparatus 1.

Although a few exemplary embodiments of the present general inventive concept have been shown and described, it would be appreciated by those skilled in the art that changes may be made in these exemplary embodiments without departing from the principles and spirit of the general inventive concept, the scope of which is defined in the claims and their equivalents.

What is claimed is:

1. A supporting device of a display apparatus to fix the display apparatus to a wall, comprising:
   a first supporting unit configured to be coupled to the display apparatus;
   a second supporting unit configured to be fixed to the wall such that the second supporting unit is coupled to the first supporting unit; and
   a position adjustment unit to move the display apparatus in three axis directions and having a first position adjustment unit to move the display apparatus in a direction perpendicular to a plane of the wall, the first position adjustment unit wholly disposed within the second supporting unit.

2. The supporting device according to claim 1, wherein the position adjustment unit comprises a second position adjustment unit to move the display apparatus in a horizontal axis direction.

3. The supporting device according to claim 2, wherein the second position adjustment unit comprises a hook provided at the first supporting unit and an upper supporting part provided at the second supporting unit, and the hook is caught by the upper supporting part such that the hook is slidable along the upper supporting part.

4. The supporting device according to claim 2, wherein the position adjustment unit comprises a third position adjustment unit to move the display apparatus in a vertical axis direction.

5. A supporting device of a display apparatus to fix the display apparatus to a wall, comprising:
   a first supporting unit configured to be coupled to the display apparatus;
   a second supporting unit configured to be fixed to the wall such that the second supporting unit is coupled to the first supporting unit; and
   a position adjustment unit to move the display apparatus in three axis directions,
   wherein the position adjustment unit comprises a first position adjustment unit to move the display apparatus in a horizontal axis direction, and wherein the position adjustment unit comprises a second position adjustment unit to move the display apparatus in a vertical axis direction, and the second position adjustment unit comprises a first coupling screw fixed to the display apparatus and a first adjustment screw to move the first coupling screw.

6. The supporting device according to claim 5, wherein the first supporting unit comprises a vertical axis long hole in which the first coupling screw moves in the vertical axis direction.

7. A supporting device of a display apparatus to fix the display apparatus to a wall, comprising:
a first supporting unit configured to be coupled to the display apparatus;
a second supporting unit configured to be fixed to the wall such that the second supporting unit is coupled to the first supporting unit; and
a position adjustment unit to move the display apparatus in three axis directions,
wherein the position adjustment unit comprises a first position adjustment unit to move the display apparatus in a horizontal axis direction, and
wherein the position adjustment unit comprises a second position adjustment unit to move the display apparatus in a direction perpendicular to the wall, and the second position adjustment unit comprises a supporting part to support the first supporting unit and a second adjustment screw to move the supporting part.

8. The supporting device according to claim 7, wherein the second supporting unit comprises a height axis long hole in which the supporting part moves in the direction perpendicular to the wall.

9. The supporting device according to claim 1, wherein the first supporting unit comprises a hook having an opening and a separation preventing part to close at least a portion of the opening.

10. The supporting device according to claim 1, wherein the supporting device comprises a plurality of supporting devices to support a plurality of display apparatuses, and height differences between the display apparatuses are adjusted by the position adjustment unit.

11. The supporting device according to claim 10, further comprising a horizontal axis connection unit to connect the supporting devices in a horizontal axis direction.

12. The supporting device according to claim 11, wherein the horizontal axis connection unit maintains a plurality of second supporting units at a predetermined interval in the horizontal axis direction.

13. The supporting device according to claim 10, further comprising a vertical axis connection unit to arrange the supporting devices in a vertical axis direction.

14. The supporting device according to claim 13, wherein the vertical axis connection unit maintains a plurality of second supporting units at a predetermined interval in the vertical axis direction.

15. The supporting device according to claim 1, further comprising a supporter to support the first supporting unit such that a predetermined distance is maintained between the display apparatus and the wall in a state in which the display apparatus is rotated.

16. A supporting device of a display apparatus to fix the display apparatus to a wall, comprising:
a first supporting unit configured to be coupled to the display apparatus;
a second supporting unit configured to be fixed to the wall and to which the first supporting unit is rotatably coupled;
a supporter selectively coupled to the first supporting unit to maintain a distance between the display apparatus and the wall; and
a position adjustment unit to move the display apparatus in three axis directions and having a first position adjustment unit to move the display apparatus in a direction perpendicular to a plane of the wall, the first position adjustment unit wholly disposed within the second supporting unit.

17. The supporting device according to claim 16, wherein the supporter is rotatably coupled to the second supporting unit.

18. The supporting device according to claim 17, wherein the supporter is configured to support the first supporting unit such that a predetermined distance is maintained between the display apparatus and the wall in a state in which the display apparatus is rotated.

19. A supporting device of a plurality of display apparatuses, comprising:
a plurality of first supporting units configured to be coupled to the display apparatuses;
a plurality of second supporting units coupled to the first supporting units to arrange the display apparatuses on a wall in a horizontal or vertical direction; and
a plurality of position adjustment units to adjust a position of the plurality of display apparatuses in at least one direction, the plurality of position adjustment units having first position adjustment units to move the display apparatuses in a direction perpendicular to a plane of the wall, the first position adjustment units wholly disposed within the plurality of second supporting units.

20. The supporting device of claim 19, wherein the at least one direction includes a vertical direction and a horizontal direction and a direction perpendicular to the wall.

21. The supporting device of claim 19, wherein the plurality of position adjustment units are configured to adjust the position of the at least one display apparatus among the plurality of display apparatuses while the position of at least one remaining display apparatus among the plurality of display apparatuses remains unchanged.

22. A supporting device to support a plurality of display apparatuses, comprising:
a combination unit configured to be coupled to the plurality of display apparatuses and a wall to support the plurality of display apparatus in a first position against the wall; and
at least one position adjustment unit coupled to the combination unit to provide a first movement of the plurality of display apparatuses in a direction perpendicular to a plane of the wall independent of a second movement of the plurality of display apparatuses in at least one of a horizontal direction and a vertical direction and to position at least one display apparatus among the plurality of display apparatuses in a second position different from the first position to define an opening between the wall and a rear of the at least one display apparatus.

23. The supporting device of claim 22, wherein the combination unit includes a pivot unit coupled to one side of the at least one display apparatus to pivot the at least one display apparatus between the first and second positions.

24. The supporting device of claim 23, wherein the opening is located incident the pivot unit and the opening increases as the at least one display apparatus moves from the first position to the second position.

* * * * *